(12) United States Patent
Hans et al.

(10) Patent No.: US 7,283,511 B2
(45) Date of Patent: Oct. 16, 2007

(54) METHOD FOR OPERATING A MOBILE RADIOTELEPHONE NETWORK

(75) Inventors: Martin Hans, Hildesheim (DE); Mark Beckmann, Hameln (DE)

(73) Assignee: Sharp Corporation, Osaka (JP)

( * ) Notice: Subject to any disclaimer, the term of this patent is extended or adjusted under 35 U.S.C. 154(b) by 990 days.

(21) Appl. No.: 10/181,464

(22) PCT Filed: Dec. 23, 2000

(86) PCT No.: PCT/DE00/04652

§ 371 (c)(1),
(2), (4) Date: Oct. 18, 2002

(87) PCT Pub. No.: WO01/58196

PCT Pub. Date: Aug. 9, 2001

(65) Prior Publication Data

US 2003/0119488 A1 Jun. 26, 2003

(30) Foreign Application Priority Data

Jan. 17, 2000 (DE) .............................. 100 01 608

(51) Int. Cl.
*H04J 3/24* (2006.01)
*H04L 12/28* (2006.01)

(52) U.S. Cl. ...................................... 370/349; 370/410
(58) Field of Classification Search ................. 370/331
See application file for complete search history.

(56) References Cited

U.S. PATENT DOCUMENTS 6,230,013 B1 * 5/2001 Wallentin et al. ............ 455/436

(Continued)

FOREIGN PATENT DOCUMENTS

| EP | 0 898 438 | 2/1999 |
|---|---|---|
| JP | 11-313358 | 11/1999 |
| JP | 2000-224194 | 1/2000 |
| WO | 99 51051 | 10/1999 |

OTHER PUBLICATIONS

3G TS 25.323 v3.0.0 (Dec. 1999), 3rd Generation Partnership Project; Technical Specification Group Radio Access Network; Packet Data Convergence Protocol (PDCP) Specification.*

(Continued)

*Primary Examiner*—Andrew C. Lee
(74) *Attorney, Agent, or Firm*—Birch, Stewart, Kolasch & Birch, LLP

(57) ABSTRACT

A method is proposed for operating a mobile radio network, which permits an error-free exchange of packet data units in the event of a connection change between a mobile unit and superordinate network units. In this regard, useful data is transmitted between the mobile unit and a first radio base station, the useful data being combined to form packet data units prior to its transmission. For the transmission of the packet data units, transmission-specific information describing an instantaneous state of the transmission is stored both in the mobile unit and in a first network unit superordinate to the first radio base station. In response to the connection change of the mobile unit from the first radio base station to a second radio base station having a second superordinate network unit, the transmission-specific information stored in the first superordinate network unit is transmitted to the second superordinate network unit to continue the transmission after the connection change essentially directly from its instantaneous state. Prior to the connection change, the transmission of the packet data units from the first radio base station to the mobile unit is halted by the first superordinate network unit. With the transmission-specific information from the first superordinate network unit, a first identifier of the packet-data unit expected as next from the mobile unit in the first superordinate network unit is transmitted to the second superordinate network unit. A first connection-change packet data unit which includes the first identifier is sent by the second superordinate network unit to the mobile unit.

13 Claims, 3 Drawing Sheets

U.S. PATENT DOCUMENTS

| | | | |
|---|---|---|---|
| 6,590,905 B1 * | 7/2003 | Suumaki et al. | 370/466 |
| 6,807,419 B1 * | 10/2004 | Laiho et al. | 455/436 |
| 6,807,421 B1 * | 10/2004 | Ahmavaara | 455/438 |
| 2001/0046863 A1 * | 11/2001 | Rinne et al. | 455/442 |
| 2005/0030958 A1 * | 2/2005 | Laiho et al. | 370/401 |

OTHER PUBLICATIONS

"Universal Mobile Telecommunications System (UMTS); MAC Protocol Specification (3G TS 25.323 Ver. 3.0.0, Release 1999)," ETS1, Jan. 2, 2000.

Global System for Mobile Communications, Digital Cellular telecommunications system (Phase 2+); General Packet Radio Service (GPRS); Mobile Station (MS)—Serving GPRS Support Node (SGSN); Subnetwork Dependent Convergence Protocol (SNDCP) (GSM 04.65 DRAFT version 6.5.0 Release 1997), TS 101 297 V6.5.0 (Nov. 1999), pp. 1-44.

Global System for Mobile Communications, Digital cellular telecommunications system (Phase 2+); General Packet Radio Service (GPRS); Mobile Station—Serving GPRS Support Node (MS-SGSN) Logical Link Control (LLC) Layer specification (GSM 04.64 DRAFT version 6.5.0 Release 1997), TS 101 351 V6.5.0 (Nov. 1999), pp. 1-59.

3GPP, 3rd Generation Partnership project; technical specification group radio access network; RLC Protocol specification (3GTS 25.322 draft version 3.1.0), (Dec. 1999) pp. 1-140.

3GPP, 3rd Generation Partnership Project; Technical specification group services and system aspects; Digital cellular telecommunications system (Phase 2+); General Packet Radio Service (GPRS); Service description; Stage 2 (3G TS 23.060 version 3.2.0), 3G TS 23.060 DRAFT v3.2.0 (Dec. 1999), pp. 1-178.

* cited by examiner

METHOD FOR OPERATING A MOBILE RADIOTELEPHONE NETWORK

FIELD OF THE INVENTION

The present invention relates to a method for operating a mobile radio network.

BACKGROUND INFORMATION

A method for operating a mobile radio network is referred to in German Unpublished Patent Application No. 199 56 062.5, in which useful data is transmitted between a mobile unit and a first radio base station, the useful data being combined to form packet data units prior to transmission. For the transmission of the packet data units, transmission-specific information describing an instantaneous state of the transmission is stored both in the mobile unit and in a first network unit superordinate to the first radio base station. If a connection of the mobile unit is changed from the first radio base station to a second radio base station having a second superordinate network unit, the transmission-specific information stored in the first superordinate network unit is transmitted to the second superordinate network unit, to continue the transmission after the connection change, essentially directly from its instantaneous state.

SUMMARY OF THE INVENTION

In contrast, it is believed that an exemplary method according to the present invention has the advantage in that the transmission of the packet data units from the first radio base station to the mobile unit is halted by the first superordinate network unit prior to the connection change, the transmission-specific information of the first superordinate network unit, a first identifier of the packet data unit expected next from the mobile unit in the first superordinate network unit is transmitted to the second superordinate network unit, and a first connection-change packet data unit, which includes the first identifier, is transmitted from the second superordinate network unit to the mobile unit. This ensures, or at least makes more probable, that no packet data units are transmitted to the mobile unit during the connection change, to prevent a faulty detection of such packet data units due to, for example, a reconfiguring or resetting of the mobile unit. Furthermore, the first connection-change packet data unit ensures, or at least makes more probable, that the mobile unit continues sending with the packet data unit expected by the second superordinate network unit, after the connection change, so that no packet data units sent during the connection change from the mobile unit to the first or the second superordinate network unit are lost, for example, due to a faulty reception or a faulty evaluation. Rather, a continuous reception, unimpaired by the reconfiguration or resetting processes of the packet data units sent by the mobile unit, which may be performed during the connection change, is ensured, or at least made more probable, in the second superordinate network unit.

It is believed that a further advantage is that the first identifier is sent by using a packet data unit formed as a connection-change packet data unit, so that it may be transmitted efficiently to the mobile unit via existing data channels, without additional signaling and without the creation and destruction of new data channels or the reconfiguration of existing data channels.

It is also believed to be advantageous in that the sending of packet data units is halted by the mobile unit after receiving the first identifier. In this manner, the mobile unit is informed of the connection change and is prevented from sending further packet data units, which may not be expected by the second superordinate network unit.

It is also believed to be advantageous in that the mobile unit transmits a second connection-change packet data unit, which includes a second identifier of the packet data unit expected next in the mobile unit, from the second superordinate network unit to the second superordinate network unit, after reception of the first identifier. This ensures, or at least makes more probable, that the sending of packet data units may be commenced again by the second superordinate network unit at the earliest possible time after the connection change. For example, when the mobile unit communicates, via the second identifier, that it is ready to receive packet data units.

It is also believed to be advantageous in that the second connection-change packet data unit is transmitted from the mobile unit to the second superordinate network unit, after reconfiguration or resetting of the mobile unit.

The reconfiguration or resetting of the mobile unit after reception of the first identifier ensures, or at least makes more probable, that packet data units, which were sent by the first superordinate network unit, are received while the mobile unit is neither reconfigured nor reset, and that all packet data units, which are received from the second superordinate network unit, are detected while the mobile unit is reconfigured or reset.

It is believed that another advantage is that packet data units are ignored by the second superordinate network unit, which are received after the connection change and prior to the receipt of the second connection-change packet data unit from the mobile unit. This may prevent packet data units, which were sent prior to the connection change but which were only received in the second superordinate network unit after the connection change, from leading to a faulty detection in the second superordinate network unit because, for example, the connection change induced a reconfiguration or a resetting of the second superordinate network unit. Thus, a reception, unimpaired by the reconfiguration or resetting processes, which may be performed in response to the connection change, of the packet data units sent by the mobile unit is ensured, or at least made more probable, in the second superordinate network unit.

It is believed that a further advantage is that the sending of packet data units from the mobile unit after reconfiguration or resetting of the mobile unit is continued with the packet data unit referenced by the first indicator, the packet data unit referenced by the first indicator and following packet data units being transmitted to the second superordinate network unit. This ensures, or at least makes more probable, that the mobile unit continues the data transmission after the connection change with packet data units adapted to the new connection to the second superordinate network unit, so that these packet data units may be detected in the second superordinate network unit.

It is believed that another advantage is that the second superordinate network unit is initialized prior to reception of the transmission-specific information. This may prevent the second superordinate network from misunderstanding the transmission-specific information, due to, for example, a lack of initialization.

It is also believed to be advantageous in that the first identifier in the first connection-change packet data unit and/or the second identifier in the second connection-change packet data unit is respectively transmitted as a sequence number of the packet data unit expected next. In this manner, only insignificant bandwidth is used for transmitting the individual connection-change packet data units, for example, when the sequence number uses 8 bits.

DETAILED DESCRIPTION

Figure 1:
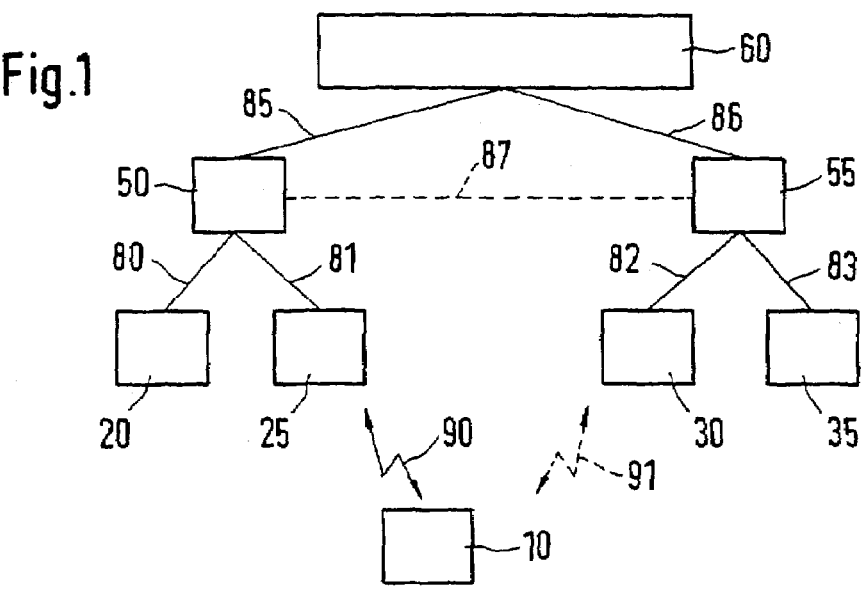
FIG. 1 is a block diagram of an mobile radio network.

An exemplary method for operating a mobile radio network 1, for example, the mobile network 1 shown in FIG. 1, according to the present invention, performs a connection change (e.g., a "relocation" during a set-up connection) between two radio base stations 25, 30. In this context, mobile radio network 1 may be set up, for example, according to the GSM standard (Global System for Mobile Communications) or according to the UMTS standard (Universal Mobile Telecommunications System). An exemplary method according to the present invention relates to the sending of transmission-specific information of the set-up connection, for example, in the as internal protocol information of a convergence protocol layer 130, 135 between two superordinate network units 50, 55 of cellular mobile radio network 1.

Cellular mobile radio network 1 includes various units 10, 20, 25, 30, 35, 50, 55, 60, which are physically interconnected. In this context, a mobile unit 10 of mobile radio network 1 may be, for example, a mobile telecommunications terminal. Mobile telecommunications terminal 10 is connected to a first radio base station 25 of mobile radio network 1 via a first air interface 90. First radio base station 25 is connected to a first superordinate network unit 50 via a first fixed-network connection 81. A second radio base station 30 is connected to a second superordinate network unit 55 via a second fixed-network connection 82. A third radio base station 20 is connected to first superordinate network unit 50 via a third fixed-network connection 80. A fourth radio base station 35 is connected to second superordinate network unit 55 via a fourth fixed-network connection 83. First superordinate network unit 50 is connected to a highest network unit 60 via a fifth fixed-network connection 85. Second superordinate network unit 55 is connected to highest network unit 60 via a sixth fixed-network connection 86. Optionally, first superordinate network unit 50 may be connected to second superordinate network unit 55 via a seventh fixed-network connection, as shown by the dotted line in FIG. 1. According to the UMTS standard, for example, first superordinate network unit 50, second superordinate network unit 55 and optional further superordinate network units may form Radio Network Subsystems (RNS). According to the UMTS standard, the highest network unit forms a GPRS Support Node (General Packet Radio System Support Node) (GSN).

Logical connections are produced in cellular mobile radio network 1 for transmitting data between mobile telecommunications terminal 10 and remaining units of mobile radio network 1 involved in the set-up connection. In this context, various types of logical connections between mobile telecommunications terminal 10 and the various participant units of mobile radio network 1 may simultaneously exist. These logical connections originate from a hierarchical model, in which each hierarchical layer corresponds to a protocol that is used both in mobile telecommunications terminal 10 and in the corresponding unit of mobile radio network 1, and that implements the corresponding logical connection.

Figure 2:
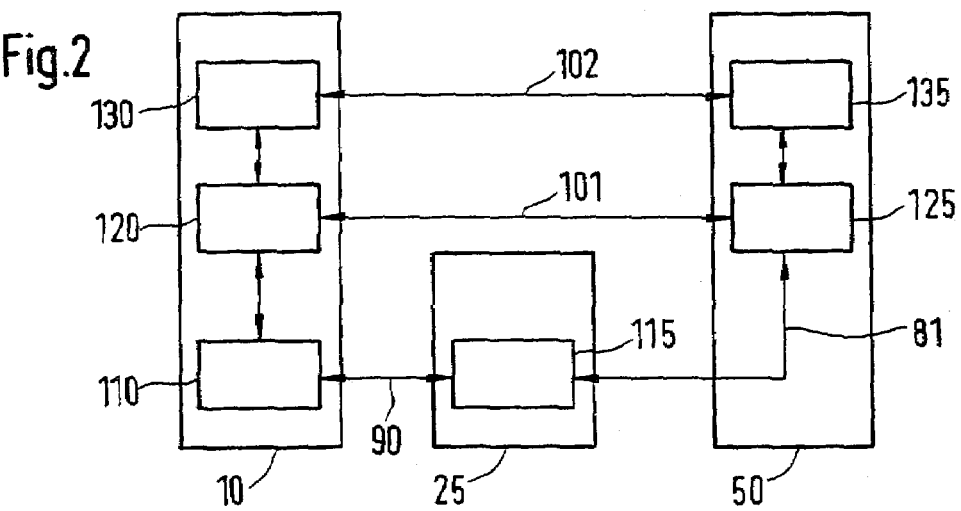
FIG. 2 is a block diagram showing a connection between a mobile unit and a first superordinate network unit via a first radio base station prior to a connection change.

FIG. 2 shows exemplary logical connections between mobile unit 10 and first superordinate network unit 50, as well as exemplary logical connections between mobile unit 10 and first radio base station 25. The lowest hierarchical layer in this hierarchical model is formed by a first physical layer 110 in mobile telecommunications terminal 10 and a second physical layer 115 in first radio base station 25, which form a physical connection, corresponding to first air interface 90, between mobile telecommunications terminal 10 and first radio base station 25 of mobile radio network 1. Above this layer is a data-protection layer, which, according to the UMTS standard, is a Data Link Layer. The Data Link layer is divided into a plurality of sublayers and performs various logical connections between mobile-telecommunications terminal 10 and first superordinate network unit 50, designated as Radio Network Controller (RNC). According to the UMTS standard, such a sublayer is the Radio Link Control layer (RLC), in which a first RLC protocol 120 in mobile telecommunications terminal 10 and a second RLC protocol 125 in first superordinate network unit 50 form a first logical RLC connection 101 as one of the indicated logical connections. Another sublayer is the Packet Data Convergence Protocol layer (PDCP), in which a first PDCP protocol 130, in mobile telecommunications terminal 10, and a second PDCP protocol 135, in first superordinate network unit 55, form a first logical PDCP connection 102. In the higher hierarchical layers, such as the network and transport layer, further protocols, e.g., the Radio Resource Control Protocol RRC, the Internet Protocol IP, the Transit Control Protocol TCP, etc., may form other logical connections. As shown in FIG. 2, adjacent layers in the hierarchical model are interconnected, superordinate layers enlisting the service of correspondingly adjacent subordinate layers. As shown in FIG. 2, second physical layer 115 is connected via the first fixed-network connection to first superordinate network unit 50 at second RLC protocol 125.

"*Technical Specification 25.301, UMTS Radio Interface Protocol Architecture*" refers to the corresponding UMTS protocol architecture of layers 2 and 3, to which the packet data convergence protocol layer belongs. The packet data convergence protocol layer and its position within this architecture may be known, for example, PDCP protocol 130, 135 is referred to in "*Technical Specification 25.323, Packet Data Convergence Protocol.*"

One task of PDCP protocol 130, 135 is to compress packet data control information, which is added by the protocols of the transport and network layer situated above the packet data convergence protocol layer, to the useful data—likewise combined in the packet data protocol layer prior to its transmission to form data units or packet data units—of an application likewise operating above the packet data convergence protocol layer, and which should be compressed prior to transmission via first air interface 90, to permit an efficient transmission.

The cellular mobile radio network may permit data transmission from mobile telecommunications terminal 10 to a unit of mobile radio network 1, even when the user of mobile telecommunications terminal 10 leaves the radio cell covered by first radio base station 25. For this purpose, a method for transferring the set-up connection for the data transmission from first radio base station 25 to second radio base station 30 (i.e. a "handover" between the radio base stations) is performed between mobile telecommunications terminal 10 and mobile radio network 1, provided that the user of mobile telecommunications terminal 10 moves into the radio cell covered by second radio base station 30.

In the case of a connection change, second radio base station 30, to which the connection should be handed over, may be connected to a different superordinate network unit than first radio base station 25, such as the case in the exemplary embodiment herein described, according to which second radio base station 30, in contrast to first radio base station 25, is connected to second superordinate network unit 55. Therefore, simultaneously with or after the connection handover from a first radio base station to a second radio base station, the connection handover (i.e., "relocation" between the network units) between first superordinate network unit 50 and second superordinate network unit 55 is also performed.

Each protocol exists at least twice on the same protocol layer plane in different network units. For example, referring to FIG. 2, the RLC protocol and the PDCP protocol exist both in mobile telecommunications terminal 10 and in first superordinate network unit 50. For example, PDCP protocols 130, 135, according to the UMTS standard, exist in mobile telecommunications terminal 10 and in first superordinate network unit 50, as well as in further superordinate network units, which are formed as RNC. In the case of a connection change, the existing data connection between mobile telecommunications terminal 10 and mobile radio network 1 is routed via second radio base station 30 and second superordinate network unit 55. Consequently, prior to the connection change, first PDCP protocol 130, in mobile telecommunications terminal 10, transmits to second PDCP protocol 135, in first superordinate network unit 55, via first logical PDCP connection 102, and after the connection change, transmits to a third PDCP protocol 136 of second superordinate network unit 55, as shown in FIG. 3.

In one exemplary embodiment according to the present invention, mobile telecommunications terminal 10 is connected to units of mobile radio network 1, such as first radio base station 25, first superordinate network unit 55, and highest network unit 60, via physical and logical connections, for example, first logical PDCP connection 102, between mobile telecommunications terminal 10 and first superordinate network unit 50 formed by first PDCP protocol 130 and second PDCP protocol 135, and a data transfer. Thus, an exchange of packet data units occurs via these connections.

In this context, first PDCP protocol 130 and second PDCP protocol 135 store transmission-specific information on the basis of its functionality for compressing and manipulating useful data and the packet-data control information. To permit correct functioning of both PDCP protocols 130, 135, a portion of the transmission-specific information should be synchronized or made identical in both PDCP protocols 130, 135. If mobile telecommunications terminal 10 moves from the radio cell in mobile radio network 1 to a new radio cell, for example, because of a movement of mobile telecommunications terminal 10 out of the transmission range of first radio base station 25, a connection change is performed and a new physical connection is set up between mobile telecommunications terminal 10 and second radio base station 30, the new physical connection covering the new radio cell.

Figure 3:
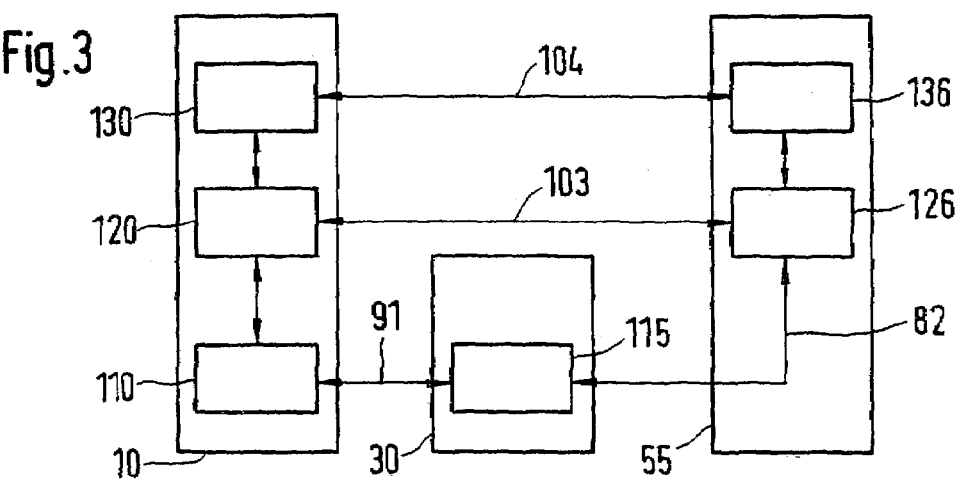
FIG. 3 is a block diagram for a connection between the mobile unit and a second superordinate network unit via a second radio base station after a connection change.

In this case, the new physical connection corresponds to a second air interface 91, as shown in FIGS. 1 and 3. FIG. 3 shows the connection of mobile telecommunications terminal 10 to second superordinate network unit 55 via second radio base station 30, the same reference numerals identifying the same elements as in FIG. 2. In this context, second radio base station 30, as shown in FIG. 3, is connected via second fixed-network connection 82 to second superordinate network unit 55, i.e., its RLC protocol, designated as third RLC protocol 126. Second superordinate network unit 55 is set up, in a similar manner, to the first superordinate network unit 50, and in a corresponding manner, has third PDCP protocol 136, in addition to third RLC protocol 126. Second radio base network 30 is connected in mobile radio network 1 to second superordinate network unit 55, which is different than first superordinate network unit 50. Thus, the logical connections between mobile telecommunications terminal 10 and second superordinate network unit 55 are newly set up. In doing so, a second logical RLC connection 103 is set up between first RLC protocol 120 and third RLC protocol 126. A second logical PDCP connection 104 is set up between first PDCP protocol 130 and third PDCP protocol 136. Thus, first logical PDCP connection 103 is replaced by second logical PDCP connection 104. Moreover, third PDCP protocol 136 should first be newly produced in second superordinate network unit 55, after the connection change.

To permit a correct data flow via second logical PDCP connection 104, first PDCP protocol 130, in mobile telecommunications terminal 10, and third PDCP protocol 136, in second superordinate network unit 55, should again be synchronized. To achieve this synchronization, the first PDCP protocol 130, in mobile telecommunications terminal 10, may be reset into a defined output state, which corresponds to the output state of third PDCP protocol 136, newly produced in response to the connection change, first PDCP protocol 130 and third PDCP protocol 136 containing the same transmission-specific information.

Figure 4:
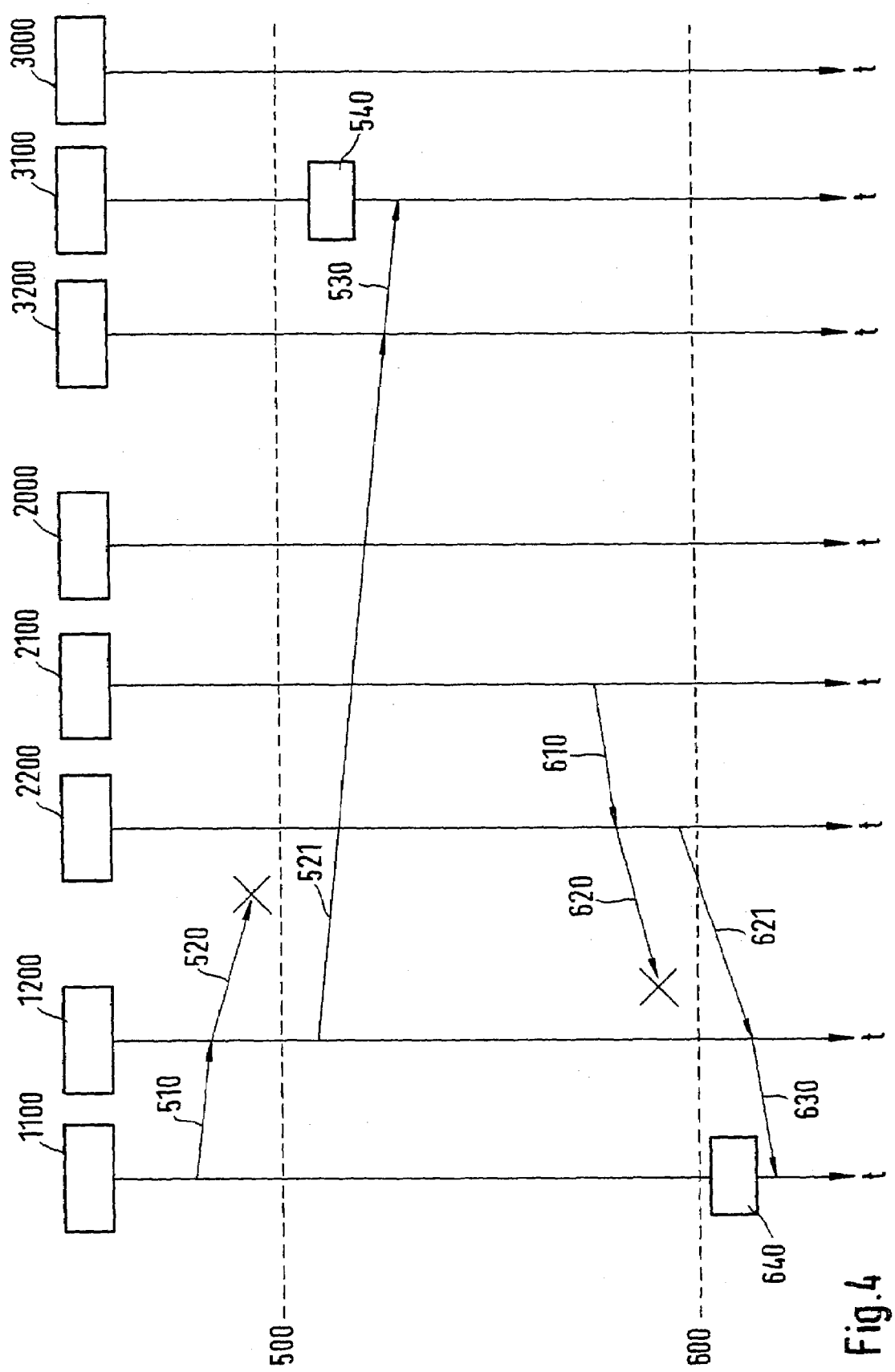
FIG. 4 is a diagram showing an exemplary time sequence of a connection change according to the related art.
Figure 5:
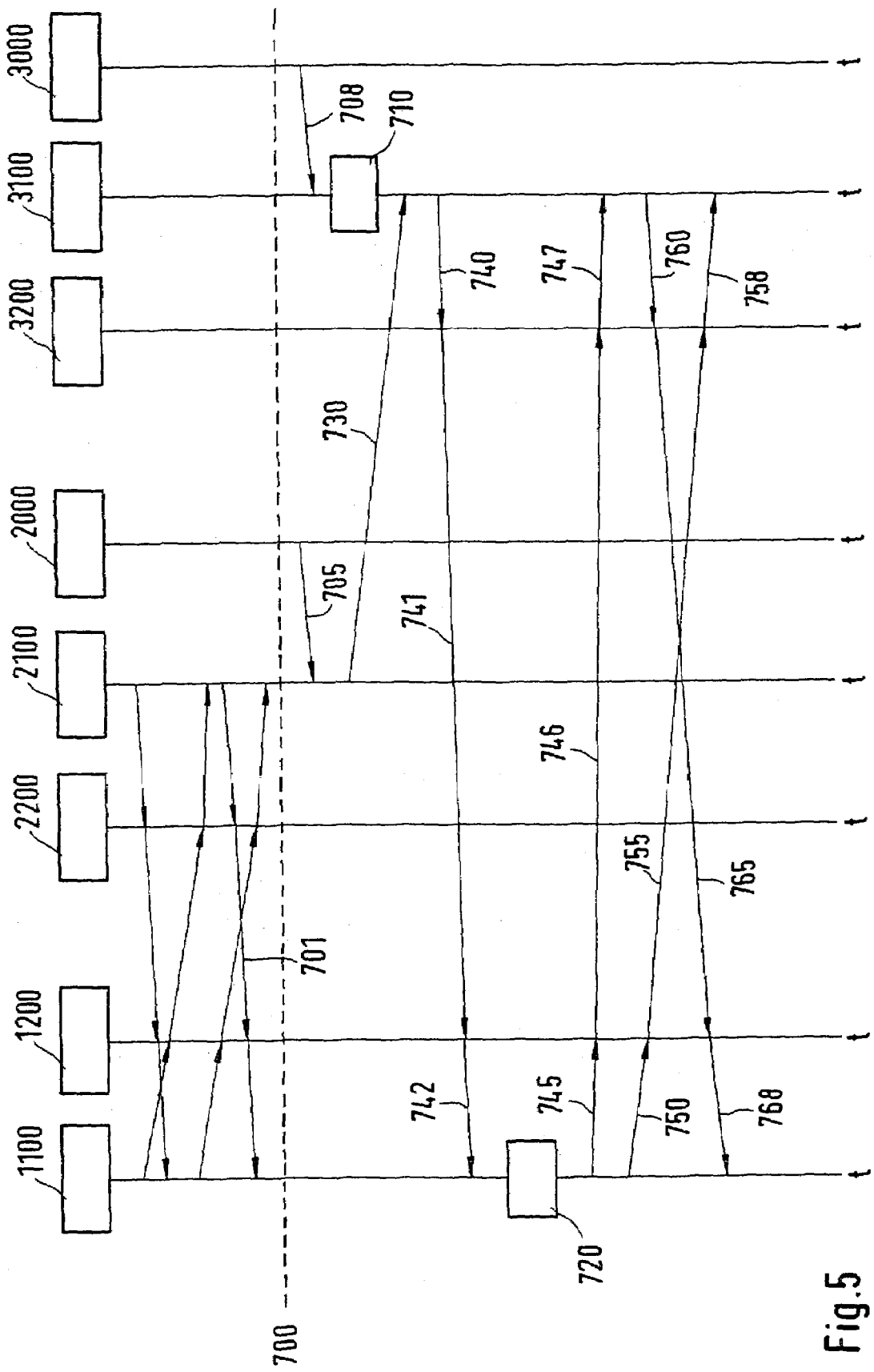
FIG. 5 is a diagram showing an exemplary time sequence of a connection change according to the present invention.

If, in the course of an existing mobile radio link between mobile unit 10 and mobile radio network 1, the superordinate network unit, via which the mobile radio link runs, changes, second RLC protocol unit 2200 provided for producing second RLC protocol 125 and second PDCP protocol unit 2100 provided for producing second PDCP protocol 135 are erased in original, first, superordinate network unit 50, and a third RLC protocol unit 3200, and a third PDCP protocol unit 3100 is set up and configure, so that, in new, second, superordinate network unit 55 that subsequently a data transmission between third RLC protocol unit 3200 and first RLC protocol unit 1200 provided for producing first RLC protocol 120, or between third PDCP protocol unit 3100 and first PDCP protocol unit 1100 provided for producing first PDCP protocol 130, thus between third RLC protocol 126 and first RLC protocol 120 or between third PDCP protocol 136 and first PDCP protocol 130 as shown in FIGS. 4 and 5 may be permitted. To guarantee, or at least make more probable, a loss-free data transmission by PDCP protocol units 1100, 2100, 3100 in the case of a connection change designated as "relocation", for reasons connected with the compression of the data, they should store and number the packet data units received from higher protocol layers. The packet data units are only erased from the memory, provided for this purpose and not shown in the Figures, when their error-free transmission has been acknowledged by the respective receiving RLC protocol unit. In this context, a method is referred to in "*Packet Data Convergence (PDCP) Protocol*", 3GPP, Technical Specification 25.323, in which:

During the data transmission, each packet data unit received from a higher protocol layer for the data transmission is numbered with the aid of a PDCP send sequence number and stored by corresponding PDCP protocol unit 1100, 2100, 3100 of the respective transmitter. Then, the packet data unit is optionally compressed and handed over to the RLC protocol layer for transmission. In corresponding PDCP protocol unit 1100, 2100, 3100 of the respective receiver, each packet data unit received by the RLC protocol layer is counted, with the giving of a PDCP receive sequence number. Since the RLC protocol layer guarantees, or at least makes more probable, a loss-free transmission of the packet data units in the proper sequence, the PDCP send sequence number corresponds to the PDCP receive sequence number of each transmitted data packet. Since mobile unit 10 and respective superordinate network units 50, 55 each may function both as transmitter and as receiver, each includes PDCP protocol units 1100, 2100, 3100, for both transmitting and receiving packet data units. Therefore, there exist PDCP send sequence numbers and PDCP receive sequence numbers both in the uplink, i.e., in the transmission link from mobile unit 10 to relevant superordinate network unit 50, 55, and in the downlink, i.e., in the transmission link from relevant superordinate network unit 50, 55 to mobile unit 10. Thus, mobile unit 10 counts the transmitted packet data units with the PDCP uplink send sequence number and counts the received packet data units with the PDCP downlink receive sequence number. Relevant superordinate network unit 50, 55 then counts the transmitted packet data units with the PDCP downlink send sequence number, and the received packet data units with the PDCP uplink receive sequence number.

If, at this point, a connection change occurs, then first superordinate network unit 50 transmits the following transmission-specific information to second, new superordinate network unit 55:

1) the PDCP-uplink receive sequence number of the next expected data packet to be received by second superordinate network unit 55, and
2) the packet data units stored in its memory and the PDCP-downlink send sequence number of the stored packet-data unit, which would have been transmitted as the next to mobile unit 10, as well as the PDCP-downlink send sequence numbers of all packet data units stored for this purpose, they being stored in the sequence in which they were received from the higher protocol layers.

Second superordinate network unit 55 sends the PDCP-uplink receive sequence number of the next data packet expected and to be received by second superordinate network unit 55 to mobile unit 10. Mobile unit 10 sends the PDCP-downlink receive sequence number of the next packet data unit expected and to be received by mobile unit 10 to second superordinate network unit 55. In this manner, respective PDCP protocol units 1100, 2100, 3100, responsible for the transmitting, in mobile unit 10 and in relevant superordinate network unit 50, 55, know which packet data units were correctly received by respective PDCP protocol unit 1100, 2100, 3100, responsible for the reception in mobile unit 10 and in relevant superordinate network unit 50, 55, prior to the connection change, and also know from which packet data unit it is necessary to begin again in the useful-data transfer after the connection change.

As indicated, the method described above is referred to in "*Packet Data Convergence (PDCP) Protocol*", 3GPP, Technical Specification 25.323. The manner in which PDCP protocol units 1100, 2100, 3100, i.e., the manner in which mobile unit 10 and relevant superordinate network unit 50, 55 behave when a connection change occurs, and how the above-described exchange of the PDCP-downlink receive sequence number and the PDCP-uplink receive sequence number, respectively, expected next, between mobile unit 10 and second superordinate network unit 55 is performed, is not described in greater detail.

The transmission-specific information may be transmitted through protocols other than PDCP protocol 130, 135, 136, for example, through Radio Resource Control protocol RRC, which also receives and processes the message concerning the occurrence of a connection change, or, for example, may be transmitted through PDCP protocol 130, 135, 136.

Formats for the packet data units (PDCP-PDUs) sent by the respective PDCP protocol layer to the respective subordinate RLC protocol layer are referred to in "*Packet Data Convergence (PDCP) Protocol*", 3GPP, Technical Specification 25.323. The "PDCP-No-Header-PDU" and the "PDCP-Data-PDU" are defined in "*Packet Data Convergence (PDCP) Protocol*".

Referring now to FIG. 4, the following problems may occur when working with the method described above:

Problem 1:

If PDCP protocol unit 1100 in mobile unit 10 hands over first packet data units 510 to RLC protocol unit 1200 in mobile unit 10 prior to a first connection change 500, and, for example, because of a first transmission error 520 prior to the first connection change 500, RLC protocol unit 1200 of mobile unit 10 first sends the packet data units to RLC protocol unit 3200 of second superordinate network unit 55, after first connection change 500, according to transmission step 521 of FIG. 4. In this case, RLC protocol unit 3200 of second superordinate network unit 55 is only capable of handing over the received packet data units according to transmission step 530 to PDCP protocol unit 3100 of second superordinate network unit 55, after first connection change 500. These packet data units received may not be properly treated, e.g., decompressed, by PDCP protocol unit 3100 of second superordinate network unit 55, since, during or after first connection change 500, the type of data manipulation in PDCP protocol unit 3100 of second superordinate network unit 55 may have changed in comparison to PDCP protocol unit 2100 of first superordinate network unit 50 due to a first re-setting process 540 of PDCP protocol unit 3100 of second superordinate network unit 55 directly after first connection change 500. First re-setting process 540 may be, for example, the re-setting of the compression algorithm in response to the initialization of PDCP protocol unit 3100 of second superordinate network unit 55.

Problem 2:

If, prior to a second occurring connection change 600, PDCP protocol unit 2100, in first superordinate network unit 50, hands over second packet data units 610 to RLC protocol unit 2200 of first superordinate network unit 50, and, for example, because of a second transmission error 620 prior to second connection change 600, RLC protocol unit 1200 of first superordinate network unit 50 then first sends these packet data units to RLC protocol unit 1200 of mobile unit 10 after second connection change 600, according to transmission step 621 of FIG. 4, RLC protocol unit 1200 of mobile unit 10 may only be capable of handing over the received packet data units according to transmission step 630 to PDCP protocol unit 1100 of mobile unit 10, after second connection change 600. These packet data units received may not be properly treated, e.g., decompressed, by PDCP protocol unit 1100 of mobile unit 10, since after second connection change 600, the type of data manipulation in PDCP protocol unit 1100 of mobile unit 10 may have changed due to a second re-setting process 640 of PDCP protocol unit 1100 of mobile unit 10 directly after second connection change 600. Second re-setting process 640 may be, for example, the re-setting of the compression algorithm in PDCP protocol unit 1100 of mobile unit 10.

An exemplary embodiment according to the present invention proposes the following for solving the problems addressed above:

To permit an exchange of PDCP receive sequence numbers between mobile unit 10 and second superordinate network unit 55, a new format for a PDCP packet data unit (PDCP-PDU) is proposed, which contains a PDCP sequence number (designated as connection-change packet data unit or as PDCP sequence-number packet data unit (PDCP-SNPDU)). To distinguish the PDCP-SNPDU from the packet data units already defined and described in the related art upon reception, the PDCP-SNPDU also contains the information element "PDU type", which may be used in the packet data units for the transmission of useful data, which in the PDCP-SNPDU, may contain, for example, a value including three bits, for example, 001, specific for the PDCP-SNPDU. Moreover, the PDCP-SNPDU contains an information element R that includes 5 bits. This information element R expands the length of the PDCP-SNPDU to a value divisible, for example, by 8. This information element may assume any value(s), and may, for example, be used for further signalings. It should be noted that additional information elements may be added to the PDCP-SNPDU. However, according to an exemplary embodiment of the present invention, only the information elements PDU type, R and PDCP sequence number are of importance in the PDCP-SNPDU. The table below shows an exemplary PDCP-SNPDU format having an 8-bit PDCP sequence number, a 3-bit PDU type information element, and a 5-bit information element R:

TABLE PDCP-SNPDU

| Bit | 8 | 7 | 6 | 5 | 4 | 3 | 2 | 1 |
|---|---|---|---|---|---|---|---|---|
| Oct 1 | | PDU type | | | | R | | |
| Oct 2 | | | | PDCP sequence number | | | | |

The PDCP-SNPDU, according to the table above, includes two octets, each consisting of 8 bits.

An exemplary method according to the present invention includes the following steps, as shown in FIG. 5:

Since the connection change is started from the network, for example, from highest network unit 60, the network begins with the first step. The normal data exchange of packet data units between mobile unit 10 and first superordinate network unit 50 is designated prior to a third connection change 700 by reference numeral 701.

Below is described the sequence after third connection change 700.

Step 1:

PDCP protocol unit 2100, in first superordinate network unit 50, stops the data transmission, via the transmission channels used up to that point in time, to mobile unit 10.

Step 2:

PDCP protocol unit 2100, in first superordinate network unit 50, transmits transmission-specific information 730, as referred to in "*Packet Data Convergence (PDCP) Protocol*", to PDCP protocol unit 3100 of second superordinate network unit 55. Among this information is the PDCP-uplink receive sequence number of the packet data unit expected next in first superordinate network unit 50, and the memory contents having the PDCP-downlink send sequence numbers of the packet data units stored for sending to mobile unit 10.

Step 3:

PDCP protocol unit 3100 of second superordinate network unit 55 sends the PDCP-uplink receive sequence number of the next expected packet data unit via RLC protocol unit 3200 of second superordinate network unit 55, according to transmission step 740, and RLC protocol unit 1200 of mobile unit 10, according to transmission step 741, to PDCP protocol unit 1100 of mobile unit 10, according to transmission step 742, by generating a PDCP-SNPDU, for example, according to the table, setting the information element according to the PDCP-uplink receive sequence number to be sent, and handing over the PDCP-SNPDU to identical RLC protocol unit 3200 of second superordinate network unit 55, and thus to the identical logical channel, namely, second logical RLC connection 103 for the error-free transmission in the correct sequence in transmission step 741 via second air interface 91, second logical RLC connection 103 also being used for the transmission of the remaining packet data units containing useful data.

PDCP protocol unit 3100 in second superordinate network unit 55 initially ignores all packet data units received from mobile unit 10 that are not PDCP-SNPDUs.

Step 4:

After PDCP protocol unit 1100 of mobile unit 10 has received the PDCP-SNPDU from second superordinate network unit 55 according to transmission step 742, it initially stops the transfer of useful data to second superordinate network unit 55.

In the event that negotiated changes 720, relating to a connection change, such as re-setting of the internal protocol information, were agreed upon during the step-up of PDCP protocol unit 1100 of mobile unit 10, it makes the changes 720.

PDCP protocol unit 1100 of mobile unit 10 subsequently sends the PDCP-downlink receive sequence number of the next packet data unit expected by it to PDCP protocol unit 3100 of second superordinate network unit 55 by generating a PDCP-SNPDU according to the table, sets the information element according to the PDCP-downlink receive sequence number, and hands over the PDCP-SNPDU according to transmission step 745 to identical RLC protocol unit 1200 of mobile unit 10, and thus to identical second logical RLC connection 103 for the error-free transmission in the proper sequence via second air interface 91, which is also used for the transmission of packet-data units transporting useful data. In this manner, RLC protocol unit 1200 of mobile unit 10 transmits the PDCP-SNPDU to RLC protocol unit 3200 of second superordinate network unit 55, according to transmission step 746. RLC protocol unit 3200 of second superordinate network unit 55 then transmits the PDCP-SNPDU to PDCP protocol unit 3100 of second superordinate network unit 55, according to transmission step 747.

In addition, PDCP protocol unit 1100 of mobile unit 10 again initiates the transfer of useful data to second superordinate network unit 55, this useful-data transfer beginning and continuing accordingly with the packet data unit referenced by the received PDCP-uplink receive sequence number and which may be identified by a corresponding PDCP-uplink send sequence number assigned by PDCP protocol unit 1100 of mobile unit 10. In this regard, the transmission, shown by way of example, of the first packet data unit after changes 720 in PDCP protocol unit 1100 of mobile unit 10 is performed according to transmission step 750, initially from PDCP protocol unit 1100 of mobile unit 10 to RLC protocol unit 1200 of mobile unit 10, and from there, according to transmission step 755, to RLC protocol unit 3200 of second superordinate network unit 55, and from there, according to transmission step 758, to PDCP protocol unit 3100 of second superordinate network unit 55.

Step 5:

After PDCP protocol unit 3100 of second superordinate network unit 55 receives the PDCP-SNPDU from mobile unit 10 according to transmission step 747, it again initiates the transfer of useful data, this useful-data transfer beginning and continuing accordingly with the packet data unit that was referenced by the received PDCP-downlink receive sequence number and that may be identified by a corresponding PDCP-downlink send sequence number assigned in PDCP protocol unit 3100 of second superordinate network unit 55.

PDCP protocol unit 3100 of second superordinate network unit 55 then sends the first packet data unit of this useful-data transfer via RLC protocol unit 3200 of second superordinate network unit 55, according to transmission step 760, and RLC protocol unit 1200 of mobile unit 10, according to transmission step 765, to PDCP protocol unit 1100 of mobile unit 10, according to transmission step 768, by handing over the packet data unit to identical RLC protocol unit 3200 of second superordinate network unit 55, and thus to the identical logical channel, namely, second logical RLC connection 103 for the error-free transmission in the proper sequence in transmission step 741 via second air interface 91. The further packet data units of the useful-data transfer are transmitted in a corresponding manner between mobile unit 10 and second superordinate network unit 55.

Exemplary steps 1-5 are shown in FIG. 5. By way of example, a first message 705 from an RRC protocol unit 2000 of first superordinate network unit 50 to PDCP protocol unit 2100 of first superordinate network unit 50 is used for initiating third connection change 700, and thus for causing the transmission of transmission-specific information 730 to PDCP protocol unit 3100 of second superordinate network unit 55. A second message 708 from an RRC protocol unit 3000 of second superordinate network unit 55 to PDCP protocol unit 3100 of second superordinate network unit 55 may be used for initiating third connection change 700, and thus for causing the one initialization 710 of PDCP protocol unit 3100 of second superordinate network unit 55, after which transmission-specific information 730 may then be received.

The necessary exchange of information may be performed via the next expected packet data unit as the corresponding sequence numbers, by way of the existing data channels, without additional signaling and without setting up and tearing down new data channels or reconfiguring existing data channels.

The proposed data format for the PDCP-SNPDU generated for this purpose by relevant PDCP protocol unit 1100, 3100 may be band-width efficient, since little unused information must be transmitted, for example, 5 bits, and no more than the necessary information, for example, 8 bits for the corresponding sequence number and 3 bits for the corresponding PDU types, are present in the PDCP-SNPDU.

With the transmission of the PDCP receive sequence number by relevant PDCP protocol unit 1100, 3100, after the respective transmission, the sequence numbers are in the protocol in which they are also evaluated. Thus, no internal data transfer from one protocol, e.g., the RRC protocol, to another is performed.

The ignoring of received packet data units of the useful-data transfer by PDCP protocol unit 3100 of second superordinate network unit 55 from the moment of third connection change 700 to the moment of the reception of the PDCP-SNPDU in second superordinate network unit 55 with the aid of transmission step 747 ensures, or at least makes more probable, that no "old" packet data units, which were still treated prior to third connection change 700 by PDCP protocol unit 1100 of mobile unit 10, but were only received after third connection change 700 by PDCP protocol unit 3100 of second superordinate network unit 55, lead to errors in PDCP protocol unit 3100 of second superordinate network unit 55.

This may be achieved because the same RLC protocol units 1200, 3200, and thus the same second logical RLC connection 103, are used both for the transmission of packet data units for the useful-data transfer and for the transmission of the PDCP-SNPDUs. Since the RLC protocol units provide for a transmission in the proper sequence of the data, after the reception of the PDCP-SNPDU, it is ensured, or at least made more probable, that no "old" packet-data units may be transmitted and given to higher protocol layers.

The resetting of PDCP protocol unit 1100 of mobile unit 10, only after reception of the PDCP-SNPDU from second superordinate network unit 55 in transmission step 742, but prior to the sending of the PDCP-SNPDU to second superordinate network unit 55 by transmission step 745, ensures, or at least makes more probable, that "old" packet data units, which were still sent by first superordinate network unit 50, are decompressed with the old, not reset PDCP protocol unit 1100 of mobile unit 10, and new packet data units, which were sent by second superordinate network unit 55, are decompressed with reset PDCP protocol unit 1100 of mobile unit 10.

What is claimed is:

1. A method of operating a mobile radio network, useful data being transmitted between a mobile unit and a first radio base station, the method comprising:
 combining the useful data into packet data units prior to a transmission of the packet data units, transmission-specific information relating to the transmission of the packet data units and describing an instantaneous state of the transmission of the packet data units being stored both in the mobile unit and in a first network unit, the first network unit being superordinate to the first radio base station;
 transmitting the transmission-specific information stored in the first network unit to a second network unit of a second radio base station if a connection change from the first radio base station to the second radio base station occurs, the second network unit being superordinate to the second radio base station, the transmission-specific information being transmitted to continue the transmission of the packet data units after the connection change;
 prior to the connection change, halting the transmission of the packet data units from the first radio base station to the mobile unit, the transmission of the packet data units being halted by the first network unit;
 transmitting a first identifier of one of the packet data units expected next from the mobile unit to the second network unit using the transmission-specific information; and transmitting a first connection-change packet data unit from the second network unit to the mobile unit, the first connection-change packet data unit including the first identifier.

2. The method of claim 1, wherein the transmission of the packet data units is halted by the mobile unit after receiving the first identifier.

3. The method of claim 1, further comprising:
transmitting a second connection-change packet data unit from the mobile unit to the second network unit after the mobile unit receives the first identifier, the second connection-change packet data unit including a second identifier identifying the packet data unit expected next from the second network unit to the mobile unit.

4. The method of claim 3, wherein the second connection-change packet data unit is transmitted from the mobile unit to the second network unit after one of reconfiguring and resetting the mobile unit.

5. The method of claim 3, further comprising:
continuing the transmission of the packet data units from the second network unit to the mobile unit after a reception of the second identifier, the transmission being continued using a packet data unit referenced by the second identifier.

6. The method of claim 3, wherein some of the packet data units received after the connection change and prior to receiving the second connection-change packet data unit from the mobile unit are ignored by the second network unit.

7. The method of claim 2, further comprising:
continuing the transmission of the packet data units from the mobile unit after reception of the first identifier by using a packet data unit referenced by the first identifier, the packet data unit referenced by the first identifier and following some of the packet data units being transmitted to the second network unit.

8. The method of claim 7, wherein the transmission of the packet data units is continued from the mobile unit after one of reconfiguring and resetting the mobile unit.

9. The method of claim 1, wherein the second network unit is initialized prior to receiving the transmission-specific information.

10. The method of claim 3, wherein at least one of the first identifier and the second identifier is transmitted as a sequence number of the packet data unit expected next.

11. The method of claim 10, wherein the sequence number is transmitted in a predefined format.

12. The method of claim 10, wherein the sequence number is transmitted in a connection-change packet data unit together with an information element indicating that the connection-change packet data unit is a connection-change packet data unit.

13. The method of claim 11, wherein the predefined format includes an eight bit value.

* * * * *